Figure 1:
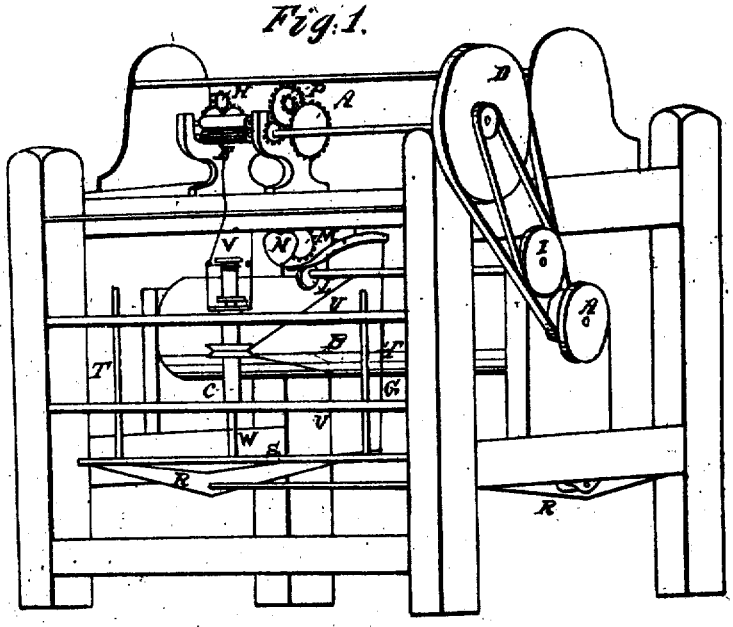
Figure 2:
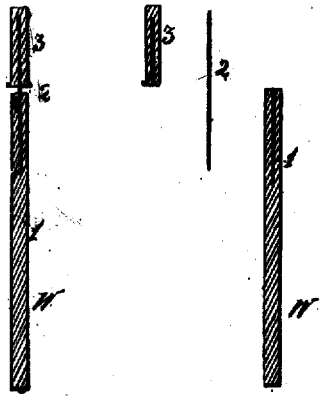

No Printed Specification Available

7373X

J. A. Bradshaw.
Spinning Mach.
Patented Jan. 18, 1833.

7373X Jan 18 1839

John A. Bradshaw, of Foxborough, Mss:
Letters Patent

The schedule referred to in these Letters Patent, and making part of the same containing a description in the words of the said John A. Bradshaw himself, of his improvement in the machine for spinning cotton yarn and thread.

---

To all to whom these presents shall come: Be it known that I, John A. Bradshaw of Foxborough, in the County of Norfolk, and Commonwealth of Massachusetts, have invented a new and useful improvement in the machine now in use for spinning cotton thread and yarn, and that the following is a full and exact description of the construction and operation of said machine, as invented or improved by me —

Fig. I. represents a perspective view of the frame and whole machine. A is a pulley on the main shaft of the spinning frame, moved by a water wheel or other propelling power. B. a drum on said main shaft which by means of a belt & pulley, drives the flier, C. which flier is perforated longitudinally to receive the spindle. D. a pulley on the end of the shaft of the front roller E. connected by a belt with the main shaft: the middle & back roller are concealed in the drawing by E. but appear in the model. F. a stud wheel geared into the front roller. G. a wheel in the back roller geared in the stud wheel F. — H. a stud wheel at the other end of the back roller geared into the middle & back rollers, giving motion to the middle roller. The rollers are so geared as to give them an increased velocity from the back to the front. I. a pulley on the shaft K at the opposite end of which is a worm L. geared into the wheel M. on the shaft of which is the heart wheel N. O. a lever with a fulcrum in the center, one end of which plays against said heart wheel. at the other end P. is a rod Q connected with the rails R.R. which have levers with fulcrums at their center. S. a horizontal rail on which the spindle rests & is fixed. T.T. are vertical rods sliding through perforations in the rails U.U. of the frame, all which by means of said heart wheel give a vertical motion to the spindle & bobbin. V. a bobbin round which the flier revolves. —

7373X

So far the machine is similar to those in common use. The new in-
vented improvement consists in the following described spindle. W.W.W.
is the shaft of the spindle as seen in the figs. I & II, it consists of three
parts, 1.2.3.. 1, the principal part of the spindle is perforated longitudi-
nally from two to six or more inches. 2, is a part that plays in said
perforation. 3, is the remaining part of the spindle (all of which is made
of steel / or any other metal) with a shoulder at the bottom on which
the bobbin rests, & with which it revolves: this part of the spindles is
also perforated similar to part 1, afore described, which perforation
receives the upper part of the part 2, of the spindle which may be
fixed in either part, 1. or 3, of the spindle or play in both of them.
This improvement gives a superior steadiness & evenness to the draft
of the thread or yarn, and said thread or yarn is less liable to break
down, and is thereby susceptible of greater speed. This improvement
may be applied to any flier now in use. —
The thread after passing through the rollers and the guide in one
arm of the flier - is received on the bobbin & by its strength causes the
bobbin to revolve the same as those now in common use —
Wrentham, Decr. 1st 1832.
— Witnesses
Melatiah Everett
Nancy S. Everett John A. Bradshaw

[illegible]